(12) United States Patent
Kharitonov et al.

(10) Patent No.: US 9,391,869 B2
(45) Date of Patent: *Jul. 12, 2016

(54) VIRTUAL NETWORK PROTOTYPING ENVIRONMENT

(71) Applicant: Juniper Networks, Inc., Sunnyvale, CA (US)

(72) Inventors: Daniel Kharitonov, Palo Alto, CA (US); Colin Constable, San Jose, CA (US); Geoffrey Huang, Mountain View, CA (US); Joel Obstfeld, Bushey (GB)

(73) Assignee: Juniper Networks, Inc., Sunnyvale, CA (US)

( * ) Notice: Subject to any disclaimer, the term of this patent is extended or adjusted under 35 U.S.C. 154(b) by 242 days.

This patent is subject to a terminal disclaimer.

(21) Appl. No.: 14/189,369

(22) Filed: Feb. 25, 2014

(65) Prior Publication Data

US 2014/0177471 A1  Jun. 26, 2014

Related U.S. Application Data

(63) Continuation of application No. 13/248,774, filed on Sep. 29, 2011, now Pat. No. 8,671,176.

(60) Provisional application No. 61/480,889, filed on Apr. 29, 2011.

(51) Int. Cl.
| | |
|---|---|
| *G06F 15/173* | (2006.01) |
| *G06F 15/177* | (2006.01) |
| *H04L 12/751* | (2013.01) |
| *H04L 12/24* | (2006.01) |

(52) U.S. Cl.
CPC ............. *H04L 45/02* (2013.01); *H04L 41/08* (2013.01); *H04L 41/084* (2013.01); *H04L 41/0806* (2013.01); *H04L 41/12* (2013.01)

(58) Field of Classification Search
CPC ... H04L 45/02; H04L 41/0806; H04L 41/084; H04L 41/08; H04L 41/12
USPC .......................................... 709/219, 223, 220
See application file for complete search history.

(56) References Cited

U.S. PATENT DOCUMENTS

| | | | |
|---|---|---|---|
| 7,536,541 B2 | 5/2009 | Isaacson | |
| 8,671,176 B1 * | 3/2014 | Kharitonov | ............. H04L 45/02 709/219 |

OTHER PUBLICATIONS

Mike Fuszner, "GNS3—Graphical Network Simulator", http://voxel.dl.sourceforge.net/project/gns-3/GNS3/0.5/GNS3-0.5-tutorial.pdf, Sep. 29, 2011, Version 1.0—48 pages.

*Primary Examiner* — Kristie Shingles

(74) *Attorney, Agent, or Firm* — Harrity & Harrity, LLP

(57) ABSTRACT

A system includes a storage device to store information associated with virtual nodes that correspond to network nodes. The system also includes a server to install a virtual node that corresponds to one of the network nodes, based on the information associated with the virtual node, where installing the virtual node includes creating a logical interface via which traffic is to be sent to, or received from, other virtual nodes; start the virtual node to create an operating virtual node based on a copy of an operating system that is run on the network node, where starting the virtual node causes the operational virtual node to execute the copy of the operating system; and cause the operating virtual node to communicate with a virtual network that includes the virtual nodes, where causing the operating virtual node to communicate with the virtual network enables the operating virtual node to receive or forward traffic associated with the virtual network.

20 Claims, 8 Drawing Sheets

VIRTUAL NETWORK PROTOTYPING ENVIRONMENT

REFERENCE TO RELATED APPLICATIONS

This application is a continuation of U.S. patent application Ser. No. 13/248,774, filed on Sep. 29, 2011, now U.S. Pat. No. 8,671,176, which claims priority to U.S. Provisional Patent Application No. 61/480,889, filed Apr. 29, 2011, the disclosures of which are incorporated herein by reference.

BACKGROUND

During planning, prototyping, and/or production phases of network development, many scenarios, that are likely to arise when the network is deployed and/or being used, need to be evaluated prior to deployment. Some of the scenarios that may arise include link failure, node failure, configuration change, feature enablement, service turn-up, software upgrade, etc. Evaluating responses to these scenarios can be performed on the deployed network, using actual network devices (e.g., routers, switches, links, etc.) and/or software (e.g., network operating system, applications, etc.). However, performing the evaluation on the actual network devices or software, associated with the deployed network (e.g., while the network is operating or in production), may reduce revenue-generating performance of the deployed network and/or disrupt services delivered to paying customers.

Another way of evaluating how the deployed network will respond to the scenarios can be performed using another network (e.g., a shadow network that includes actual network devices) that represents the deployed network. However, using a shadow network to emulate the deployed network may be cost-prohibitive (e.g., particularly for large-scale deployed networks that include many network devices and/or operating system instances) or may insufficiently approximate how the deployed network will respond. Additionally, a virtual network may be used to emulate the deployed network using software programs that represent characteristics of actual network devices within the deployed network. The virtual network (sometimes referred to as a "modeled network") may be able to mimic certain aspects of the deployed network (e.g., behavior of routing protocol logic, etc.), but are not suitable for eliciting responses that are identical to responses generated by the deployed network due to differences between the software programs and the actual network devices (e.g., forwarding plane rules, control plane protocols, etc.).

SUMMARY

According to one aspect, a method may include receiving, by a device, a request to create a group of virtual nodes associated with a virtual network, the group of virtual nodes corresponding to a set of network nodes associated with a network, where the first request may include configuration information associated with the group of virtual nodes; receiving, in response to the request, selection of a virtual node, of the group of virtual nodes, on which to perform an install operation, where the selected virtual node may correspond to a network node of the set of network nodes; installing, in a memory associated with the device, the configuration information associated with the selected virtual node to create the virtual node, where installing the configuration information may permit creation of one or more logical interfaces, associated with the created virtual node, that enable network traffic to be sent to, or received from, other virtual nodes of the group of virtual nodes; retrieving, from the memory, a copy of a network node operating system that is executed by the network node that corresponds to the created virtual node; starting, using the network node operating system, the created virtual node to create an operational virtual node; causing the operational virtual node to execute a copy of the network node operating system based on configuration information associated with the network node, where the configuration information, associated with the network node, may include information associated with hardware or software components included in the network node; causing the operational virtual node to communicate with the other virtual nodes to obtain network topology information associated with a virtual network that includes the group of virtual nodes; and instructing the operational virtual node to generate routing tables based on the network topology information, where the routing tables may enable the operational virtual node to process traffic associated with the virtual network.

According to another aspect, a server device may include a memory to store configuration information associated with a group of virtual nodes, where the group of virtual nodes may correspond to a set of network nodes. The server device may also include a processor to receive a request to start up a virtual node, of the group of virtual nodes, on the server device; retrieve, from the memory and in response to the request, configuration information associated with the virtual node, where the configuration information may include logical interface information and an identifier of a copy of an operating system being run by one of the set of network nodes, to which the virtual node corresponds; connect the virtual node to one or more other virtual nodes, of the group of virtual nodes, via one or more virtual links based on the logical interface information; retrieve, from the memory and using the identifier, the copy of the operating system being run by the one of the set of network nodes, the copy of the operating system including control plane protocols and forwarding plane rules; start up the virtual node, to create a running virtual node that executes the copy of the operating system; cause the running virtual node to communicate with the one or more virtual nodes to obtain network topographical information associated with a virtual network that includes the group of virtual nodes, where the topographical information may enable the running virtual node to generate routing tables based on the control plane protocols and generate forwarding tables based on the forwarding plane rules; and cause the running virtual node to process traffic sent to or received from at least one of the one or more virtual nodes based on the routing tables or the forwarding tables.

According to yet another aspect, a system may include a storage device to store configuration information associated with a group of virtual nodes, where the group of virtual nodes corresponds to a set of network nodes. The system may also include a server device to perform an install operation on a virtual node, of the group of virtual nodes, based on the configuration information associated with the virtual node, where the virtual node may correspond to one of the set of network nodes, and where the install operation may include creating at least one logical interface via which network traffic is to be sent to, or received from, one or more of the group of virtual nodes. The server device may also start up the virtual node, to create a running virtual node based on a copy of an operating system that is run on the one of the set of network nodes, where starting up the virtual node may cause the operational virtual node to execute the copy of the operating system; and cause the operating virtual node to communicate with a virtual network, the virtual network including the group of virtual nodes, where causing the operating virtual node to communicate with the virtual network may enable the operating virtual node to receive, process, or forward network traffic associated with the virtual network.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

Figure 1:
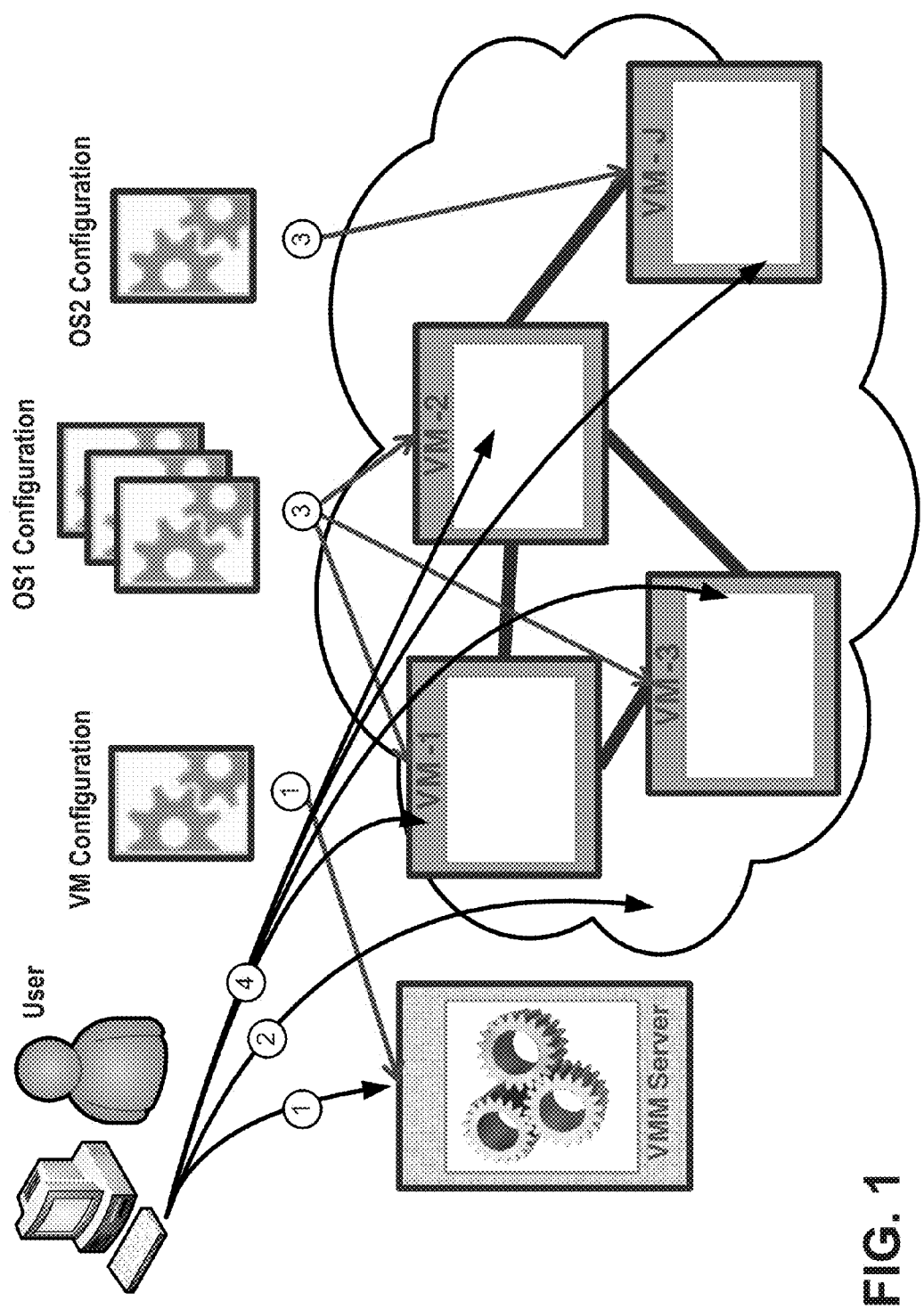
FIG. 1 is a diagram of an overview of a virtual network prototyping environment implementation described herein.

The following detailed description refers to the accompanying drawings. The same reference numbers in different drawings may identify the same or similar elements. Also, the following detailed description does not limit the invention.

Overview

An implementation described herein may include systems and/or methods that provide a virtual network prototyping environment that enables a network to be modeled, using logically interconnected virtualized network devices (e.g., based on virtual machines (VMs)). The environment may permit changes to the network and/or conditions associated with the network to be evaluated prior to deploying the network (e.g., to make the network operational) and/or prior to making changes to the network (e.g., including hardware and/or software changes). As described herein a virtual network prototyping environment application (hereinafter referred to as a "VNPE application") may enable VMs to be logically created in a manner that corresponds to network devices (e.g., network nodes that include switches, routers, traffic generators, etc.) within a network. The VNPE application may, for example, permit the VMs to be logically interconnected to form a virtualized network prototyping environment (hereinafter referred to as a "virtualized network" and/or a "virtual network"), where logical interconnections between VMs correspond to network paths that interconnect network devices in the network. Additionally, or alternatively, the VNPE application may permit VMs to be established that are associated with a component or set of components of a network device (e.g., a packet forwarding engine (PFE), a routing engine (RE), physical links, etc.). All or a portion of the VMs may be hosted by a server device (e.g., a lap top computer, a server, etc.) that is running a general purpose operating system (e.g., a Windows®-based operating system, a Unix®-based operating system, etc.) at significantly less cost than a shadow network (e.g., a network that includes hardware and/or software that corresponds to a deployed, or soon-to-be-deployed, network).

As further described herein, all or a portion of the VMs associated with a virtual network may run an exact copy and/or image of a network operating system that is run by all or a portion of the network devices to which the VMs correspond. For example, a VM running a copy of a network operating system, used by a network node (e.g., such as a router) to which the VM corresponds, may perform operations using the copy of rules and/or protocols associated with a control plane and/or a forwarding plane associated with the network node. The VM may, thus, perform operations, as a virtual network node (hereinafter referred to as "virtual node"), in a manner similar to the network node to which the virtual node corresponds. Additionally, running an exact copy of the network operating system may enable the virtual node, to emulate aspects of the network node, such as, for example, forwarding plane rules, control plane protocols (e.g., encapsulation, network addresses, etc.) that cannot be emulated by commercially-available emulation systems and/or applications that use a software code that is not an exact copy or instance of the network operating system.

Virtual nodes may be logically interconnected to form a virtual network via which traffic is transported and/or processed. The virtual network may be connected (e.g., via a physical interface) with an actual network node and/or network and may receive, process, and/or transport packet streams associated with traffic received from the network node and/or network. In another example, a virtual network may be a fully-enclosed software entity that generates packets streams for a network node, and/or receives packet streams from a network node. The virtual network may analyze properties of transported packet streams (e.g., encapsulation, addresses, bandwidth, etc.) and/or generate reports regarding the properties.

Using a virtual node and/or a virtualized network, as described above, permits changes to the network architecture, network operating systems and/or conditions identified on the network to be modeled, tested, and/or evaluated without using an actual network or a shadow network. For example, planned changes in network architecture (e.g., changes in operating system software, network device upgrades, etc.) may be tested on a virtual node and/or a virtualized network to determine whether the changes cause an undesired and/or unexpected result and/or whether any conditions, due to the changes, are detected via the virtual node and/or on the virtualized network. The VNPE application may enable a copy and/or an image of the planned changes to be evaluated using the virtual node and/or virtualized network, which may ensure accuracy of modeling without incurring the cost of using a shadow network or incurring the risk associated with using a deployed and/or production network. Additionally, or alternatively, the VNPE application may enable traffic flow information and/or parameters associated with the virtual node and/or virtualized network to be presented to a network administrator, via a virtualized network user interface, which may assist the network administrator to evaluate network performance, network services, and/or to detect conditions associated with the network.

A virtual device (e.g., virtual node, virtual link, etc.), being a VM, may include many of the same characteristics as a network device, such as a unique operating system, processing resources, memory resources and/or storage capacity. For example, a virtual device may perform all or a portion of operations performed by a network device, such as receive input, run applications and/or operating systems, perform computations, process and/or store information, communicate with other devices, and/or provide output. Unlike an actual network device, however, a particular virtual device may not be directly tied to specific hardware and/or a single physical device (e.g., a server device, memory device, database, processor, etc.). For example, a particular virtual device may derive its characteristics and/or capability to perform operations from one or more server devices that may be receiving instructions from another server device that is independent from the particular virtual device. Additionally, or alternatively, a particular virtual device may execute a particular operating system (e.g., a guest operating system), such as an operating system (e.g., a Juniper Networks® operating system, a Cisco® operating system, etc.) that is run by a network device to which the particular virtual device corresponds. In this example, the particular virtual device, may derive its characteristics and/or capability to perform operations (e.g., using the guest operating system) from one or more server devices that may be executing an independent operating system (e.g., a host operating system), such as a general purpose operating system (e.g., a Microsoft Windows®-based operating system, a Sun Solaris®-based operating system, etc.).

As described herein, therefore, one or more server devices may support one or more virtual devices, in which each virtual device may execute a unique guest operating system and/or may perform operations, independent of the underlying one or more server devices, using processing resources (e.g., CPU quantity), memory resources (e.g., RAM size) and/or storage resources (e.g., data stores and/or disk space) from one or more underlying server devices.

Example Virtual Network Prototyping Environment

FIG. 1 is a diagram of an overview of a virtual network prototyping environment implementation described herein. As illustrated in FIG. 1, a user of a virtual machine manager (VMM) server may interact with a VNPE application, hosted by the VMM server, that enables a virtualized network to be created and/or to run on the VMM server. For example, as shown by indication 1, the user may use the VNPE application to create a VM (e.g., a virtual node) that corresponds to a network node on a network. In one example, the VNPE application may present a VM set up user interface (UI) via which a user my specify configuration information for a VM. The configuration information may include a VM identifier; information associated with an operating system to be loaded in the VM (e.g., a copy of an operating system on which the network node runs); information associated with an interface via which the VM is to communicate with another VM within the virtual network; and/or information associated with a storage location, within the VMM server, at which configuration information, associated with the network node to which the VM corresponds, is stored. The VNPE application may store, in a memory associated with the VMM server, configuration information associated with the VM as specified by the user. The user may create other VMs that correspond to other network nodes, until a virtual network is established that represents a deployed or soon-to-be-deployed network.

As also shown in FIG. 1, the user may use the VNPE application to perform an operation to power up a VM. For example, as shown by indication 2, the user may view a list of created VMs (e.g., created in a manner described above) presented by the VNPE application and may select a VM, or collection of VMs, to be powered up (e.g., booted, started up, etc.). The VNPE application may receive the selected VMs and may perform an operation to power up each selected VM and logically simulate layer-two connectivity between the selected VMs. The simulated layer-two (e.g., data link layer) connectivity may be established via virtual interfaces specified for each VM, by the user during the VM set up operation.

As further shown in FIG. 1, each of the interconnected VMs may be configured by the VNPE application to perform operations in a virtual network. For example, the VNPE application may instruct each VM to read, from a memory associated with the VMM server, configuration information (e.g., generated by the VM set up operation), as shown by indication 3, that may be used to configure each VM to perform operations associated with the virtual network. In one example, the VNPE application may use configuration information to assign Internet protocol (IP) addresses to virtual interfaces, as specified by the user, associated with a VM. In another example, the VNPE application may install a copy of a network node operating system, on which a network node corresponding to the VM runs, in the VM. In this example, the copy of the network node operating system may include a same set of control plane rules associated with protocols used by the network node (e.g., IP version 4 (v4), IPv6, multiprotocol label switching (MPLS) protocol, etc.). In yet another example, the copy of the network node operating system may include a forwarding plane that performs packet/data processing and packet forwarding operations using the control plane rules, in the manner performed by the network node to which the VM corresponds. In this example, the VNPE may install the network node configuration file in the VM. The configured VM may run the copy of the network node operating system and may communicate with other VMs, using routing protocols included in the network node operating system, to obtain information associated with virtual network topology, to generate routing tables based on the virtual network topology, and/or to create forwarding tables based on the routing tables.

As yet further shown in FIG. 1, the user of the VMM server may use the VNPE application to interact with VMs associated with the virtual network. For example, the user may use the VNPE application to log into a VM using a particular interface (e.g., a management interface and/or a telnet interface), as shown by indication 4, to perform monitoring and/or control functions. The VNPE application may, for example, generate a virtual network user interface (UI) that the user may use to evaluate and/or visualize traffic flow and/or to identify conditions associated with the virtual network. In another example, a user interface associated with a particular VM, may display IP addresses associated with ports on the VM, to view resources associated with the VM (e.g., interfaces being used, operating systems being run, media access control (MAC) addresses assigned, etc.), etc. In yet another example, the user may use the user interface to pause, stop, delete, and/or edit a VM. In this example, the user may install an updated version of operating system software in a particular VM to determine, via the virtual network UI, affects on traffic flow, whether a condition is detected as a result of the updated version of the operating system, etc. In one example, if the performance of the virtual network is adversely affected (e.g., a condition arises and/or traffic flow is curtailed, etc.), then the network administrator (e.g., the user) may determine that the updated software needs to be revised and/or is not to be installed in a network node within the network. In another example, if the updated operating system software does not adversely affect virtual network performance, then the network administrator may determine that the updated operating system software may be installed in the network.

Example Network

Figure 2:
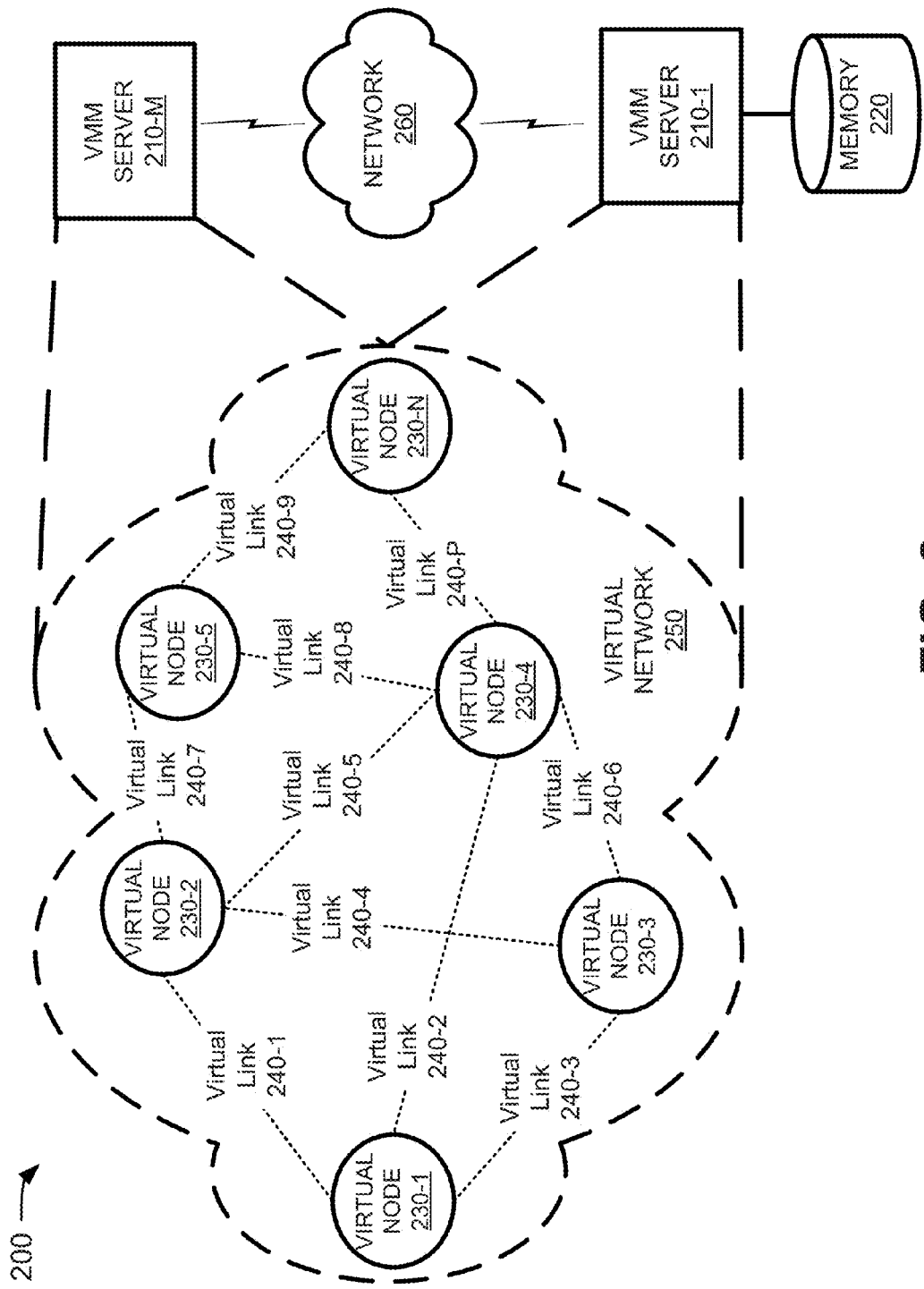
FIG. 2 is a block diagram of an example network in which systems and/or methods described herein may be implemented.

FIG. 2 is a block diagram of an example network 200, in which systems and/or methods described herein may be implemented. Network 200 may include a group of virtual machine manager (VMM) servers 210-1, ..., 210-M (where M≥1) (individually referred to as "VMM server 210" and collectively referred to as "VMM servers 210"), a memory 220, a group of virtual nodes 230-1, ..., 230-N (where N≥1) (individually referred to as "virtual node 230" and collectively referred to as "virtual nodes 230"), a group of virtual links 240-1, ..., 240-P (where P≥1) (individually referred to as "virtual link 240" and collectively referred to as "virtual links 240"), a virtual network 250, and/or a network 260. The number of devices and/or networks, illustrated in FIG. 2, is provided for explanatory purposes only. In practice, there may be additional devices and/or networks, fewer devices and/or networks, different devices and/or networks, or differently arranged devices and/or networks than illustrated in FIG. 2. Also, in some implementations, one or more of the devices and/or networks of network 200 may perform one or more functions described as being performed by another one or more of the devices and/or networks of network 200. For example, VMM server 210 and/or memory 220 could be integrated into a single device that performs all or some of the functions described below as being performed by an individual one of these devices. Devices of network 200 may interconnect via wired connections, wireless connections, or a combination of wired and wireless connections.

VMM server 210 may include one or more devices (e.g., a personal computer, a laptop, a server device, a wireless device, such as a mobile phone or a personal digital assistant (PDA), or the like), or other types of computation or communication devices, that gather, process, search, store, and/or provide information in a manner similar to that described herein. VMM server 210 may interface with virtual network 250, network 260, and/or memory 220. In one implementation, VMM server 210 may host a general purpose operating system (e.g., a Microsoft Windows®-based operating system and/or other general purpose operating systems) that may be used, by VMM server 210 as a host operating system that enables VMM server 210 to perform operations in a manner described herein.

In another implementation, VMM server 210 may include logic and/or software associated with a VNPE application that may be used by VMM server 210 to perform operations associated with a virtual network that corresponds to a network (e.g., network 260 or some other network). For example, VMM server 210 may use the VNPE application to set up and/or create one or more interconnected VMs (e.g., virtual nodes 230 interconnected by virtual links 240). In this example, the VNPE application may permit a user of VMM server 210 to specify configuration information associated with virtual node 230 to be included in a virtual network (e.g., virtual network 250).

In another example, the VNPE application may be used to configure and/or power up virtual node 230 that corresponds to a network node associated with the network. In this example, the VNPE application may install configuration information (e.g., obtained when virtual node 230 was set up) and may read, from a memory (e.g., memory 220), configuration information associated with a network node to which the virtual node corresponds. In yet another example, the VNPE application may read, from the memory, a copy and/or image of a guest operating system used by the network node and may install the guest operating system in virtual node 230. The copy of the guest operating system may, for example, be a special purpose and/or network node operating system (e.g., a JUNOS®-based operating system, a Cisco®-base operating system, and/or some other special purpose operating system) that enables the network node to perform control plane and/or forwarding plane operations within virtual network 250. Control plane operations may include, for example, packet processing operations associated with rules and or protocols included in the copy of the network node operating system (e.g., including protocols such as IPv4, IPv6, MPLS, LPS, etc.). Forwarding plane operations may include, for example, packet forwarding operations (e.g., generating routing tables, forwarding tables, performing packet forwarding lookup operations, etc.) based on protocols included in the copy of the network node operating system.

In a further example, the VNPE application may enable a user to interact with virtual nodes 230 via a virtual network user interface (UI). In this example, the user may evaluate traffic flow within virtual network 250, via a particular virtual node 230, and/or over a particular virtual link 240. The user may use the VNPE application and/or virtual network UI to start, stop, pause, delete, and/or update configuration information and/or operating system software associated with virtual node 230. The user may use the virtual network UI to view resources associated with virtual node 230 and/or perform other operations associated with virtual node 230 and/or virtual network 250.

Memory 220 may include a device that stores information associated virtual node 230. For example, memory 220 may include virtual node 230 configuration information. In another example, memory 220 may store a copy of a network node operating system corresponding to a network device to which virtual node 230 corresponds. In yet another example, memory 220 may store information associated with the network node. In still another example, memory 220 may store information associated with a state of virtual node 230, such as an instantaneous traffic flow, information associated with routing tables and/or forwarding tables, and/or information associated with virtual network topology. Memory 220 may store information associated with a set up UI and/or a virtual network UI, which may be retrieved, by VMM server 210, to be presented for display on a display device associated with VMM server 210. Memory 220 may receive read requests and may retrieve information stored on memory 220 in response to the read requests. Memory 220 may receive write requests and may store information in memory 220 in response to the write requests.

Virtual node 230 may be implemented within one or more server devices, or other types of computation or communication devices, that gather, process, search, store, and/or provide information in a manner similar to that described herein. Virtual node 230 may be a VM in a sense that each virtual node 230 may exist as software that presents an interface for one or more underlying computing devices. Virtual node 230 may execute a unique guest operating system and/or may perform operations, independent of the underlying one or more server devices (e.g., VMM server 210), using processing resources (e.g., CPU quantity), memory resources (e.g., RAM size) and/or storage resources (e.g., data stores and/or disk space) from one or more underlying server devices.

Virtual node 230 may interface with other virtual nodes 230 within virtual network 250 via virtual links 240 and/or may interface with VMM server 210 directly and/or via network 260. In one implementation, virtual node 230 may run a copy and/or image of a network node operating system (e.g., as a guest operating system), which may run in parallel on VMM server 210 running a different operating system (e.g., a host operating system). Virtual node 230 may run the image of the network node operating system and may potentially present interfaces for different virtual nodes 230 that may gather, process, search, store, and/or provide information in a manner similar to that described herein.

In one example implementation, virtual node 230 may read (e.g., from VMM server 210 and/or memory 220) configuration information that was created when virtual node 230 was set up by a user of VMM server 210. In this example, virtual node 230 may run the image of the network node operating system and may perform control plane and/or forwarding plane operations governed by the network node operating system. In one example, virtual node 210 may use configuration information to assign IP addresses and/or MAC addresses to ports and/or interfaces that may establish logical interfaces (e.g., virtual links 240) between virtual node 230 and another virtual node 230. In another example, virtual node 230 may communicate with other virtual nodes 230, via virtual links 240, to obtain topology information associated with virtual network 250. Virtual node 230 may, for example, use the topology information and/or control plane rules or protocols and may act like a virtual routing engine (RE) to generate routing tables from which forwarding tables may be created for each virtual packet forwarding engine (PFE) associated with virtual node 230. Virtual node 230 may, for example, identify virtual PFEs, associated with virtual node 230, based on configuration information (e.g., that may include PFE identifiers), associated with a network node to which virtual node 230 corresponds.

In yet another example, virtual node 230 may receive traffic from another virtual node 230 via virtual link 240 and may process the received traffic (e.g., based on, for example, a MPLS protocol, an IPv4, IPv6, and/or another protocol). In one example, virtual node 230 may receive network traffic destined for a particular virtual node 230, and may perform a look up operation using forwarding tables associated with a particular virtual PFE via which the traffic was received. In one example, virtual node 230 may use the forwarding tables to look up a next hop (e.g., an adjacent virtual node 230) based on a destination address identified from the received network traffic. Based on the look up operation, virtual node 230 may forward the received traffic to the next hop, via another virtual PFE and a particular virtual link 240. In another example, virtual node 230 may determine, based on the look up operation, that the received traffic is to be sent to the next hop via the PFE that received the traffic and via another virtual link 240.

Virtual link 240 may be implemented within one or more server devices, or other types of computation or communication devices, that gather, process, search, store, and/or provide information in a manner similar to that described herein. Virtual link 240 may be a logical interconnection in a sense that each virtual link 240 may exist as software that runs on one or more underlying computing devices (e.g., VMM server 210). In one example implementation, virtual link 240 may logically interconnect virtual node 230 to another virtual node 230 over which traffic, associated with virtual network 250, is to be transported. For example, virtual link 240 may interconnect a particular interface associated with virtual node 230 to another interface associated with another virtual node 230. More particularly, virtual link 240 may be an Ethernet connection that connects virtual node 230, that includes an Ethernet interface (e.g., associated with a particular Ethernet IP address), to another virtual node 230 that includes another Ethernet interface (e.g., associated with another Ethernet IP address). Virtual link 240 that interconnects virtual node 230 to another virtual node 230 may be established when a user creates virtual node 230 during a VM set up operation.

Virtual network 250 may be implemented within one or more server devices, or other types of computation or communication devices, that gather, process, search, store, and/or provide information in a manner similar to that described herein. In one example implementation, virtual network 250 may exist as software on one or more underlying server devices (e.g., VMM server 210) and/or may include virtual nodes 230 and/or virtual links 240, which may correspond to a network (e.g., network 260 or some other network). For example, virtual network 250 may be established in a manner that includes virtual nodes 230 that correspond to network nodes within a network (e.g., network 260) that are logically interconnected by virtual links 240 that correspond to network paths that interconnect network nodes within the network.

Network 260 may include one or more wired and/or wireless networks. For example, network 260 may include a cellular network, the Public Land Mobile Network (PLMN), and/or a second generation (2G) network, a third generation (3G) network, a fourth generation (4G) network, a fifth generation (5G) network, and/or another network. Additionally, or alternatively, network 220 may include a wide area network (WAN), a metropolitan area network (MAN), a telephone network (e.g., the Public Switched Telephone Network (PSTN)), an ad hoc network, an intranet, the Internet, a fiber optic-based network (e.g., a fiber optic service (FiOS) network), and/or a combination of networks.

Figure 3:
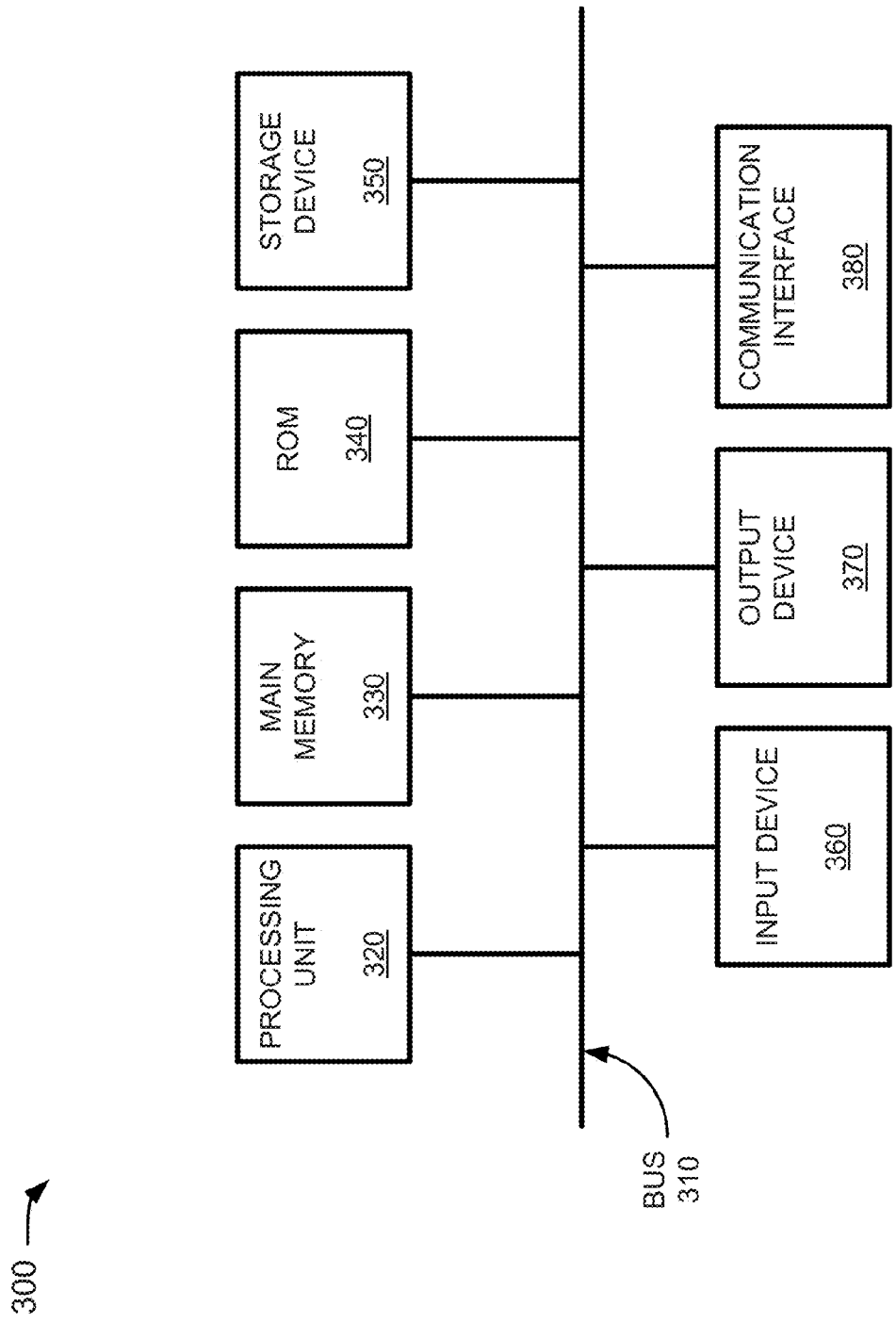
FIG. 3 is a diagram of example components of one or more of the devices of FIG. 2.

FIG. 3 is a diagram of an example device 300 that may correspond to one or more devices in network 200, such as VMM server 210. Alternatively, each VMM server 210 may include multiple devices 300. As illustrated, device 300 may include a bus 310, a processing unit 320, a main memory 330, a read-only memory (ROM) 340, a storage device 350, an input device 360, an output device 370, and/or a communication interface 380. Bus 310 may include a path that permits communication among the components of device 300.

Processing unit 320 may include a processor, a microprocessor, an application-specific integrated circuit (ASIC), a field programmable gate array (FPGA), or another type of processing unit that may interpret and execute instructions. Main memory 330 may include a RAM or another type of dynamic storage device that may store information and instructions for execution by processing unit 320. ROM 340 may include a ROM device or another type of static storage device that may store static information and/or instructions for use by processing unit 320. Storage device 350 may include a magnetic and/or optical recording medium and its corresponding drive, or a type of flash memory.

Input device 360 may include a mechanism that permits an operator to input information into device 300, such as a keyboard, a mouse, a pen, a button, voice recognition and/or biometric mechanisms, a touch screen, etc. Output device 370 may include a mechanism that outputs information to the operator, such as a display, a speaker, a light emitting diode (LED), etc. Communication interface 380 may include any transceiver-like mechanism that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.) or a combination of wireless and wired communications. For example, communication interface 380 may include mechanisms for communicating with another device or system via a network, such as network 260.

As described herein, device 300 may perform certain operations in response to processing unit 320 executing software instructions contained in a computer-readable medium, such as main memory 330. A computer-readable medium may be defined as a physical or logical memory device. A logical memory device may include space within a single physical memory device or spread across multiple physical memory devices. The software instructions may be read into main memory 330 from another computer-readable medium, such as storage device 350, or from another device via communication interface 380. The software instructions contained in main memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in other implementations, device 300 may contain fewer, additional, different, or differently arranged components than depicted in FIG. 3. In still other implementations, one or more components of device 300 may perform one or more tasks described as being performed by one or more other components of device 300.

Example Virtual Node Configurations

Figure 4:
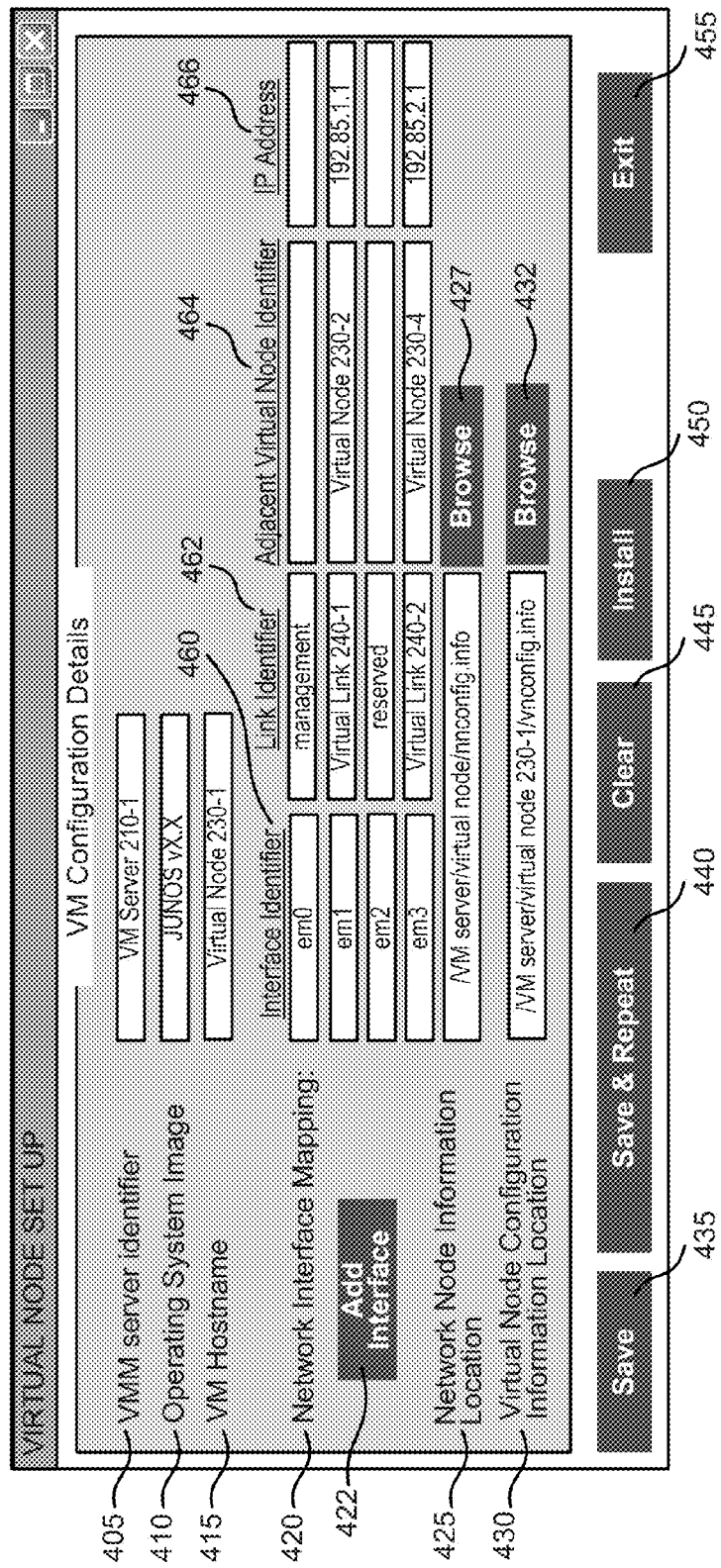
FIG. 4 is a diagram of an example virtual node set up user interface.

FIG. 4 is a diagram of an example virtual node set up UI 400 (hereinafter referred to as "set up UI 400"). As shown in FIG. 4, set up UI 400, may include a collection of fields and/or buttons, such as a VMM server identifier field 405, an operating system image field 410, a hostname field 415, a network interface mapping field 420, an add interface button 422, a network node information location field 425, a browse button 427, a virtual node configuration information location field 430, a browse button 432, a save button 435, a save & repeat button 440, a clear button 445, an install button 450, and/or an exit button 455. Set up UI 400 includes fields and/or buttons 405-455 for explanatory purposes. In practice, set up UI 400 may include additional fields and/or buttons, fewer fields and/or buttons, different fields and/or buttons, and/or differently arranged fields and/or buttons than are described with respect to set up UI 400 of FIG. 4.

VMM server identifier field 405 may store an identifier associated with a particular VMM server 210 (e.g., VMM server 210-1) on which a particular virtual node 230 (e.g., to be set up using set up UI 400) is to be hosted. Operating system image field 410 may store an identifier of a copy of a particular network node operating system that is run on by a network node, associated with a network (e.g., network 260), to which the particular virtual node 230 corresponds. Hostname field 415 may store an identifier associated with the particular virtual node 230, which corresponds to the network node.

Network interface mapping field 420 may store information associated with interfaces, belonging to the particular virtual node 230, that enable the particular virtual node 230 to communicate with other virtual nodes 230 associated with a virtual network (e.g., virtual network 250). For example, the information associated with interfaces that belong to the particular virtual node 230 may include an interface identifier field 460, a link identifier field 462, an adjacent virtual node identifier field 464, and/or an IP address field 466. Interface identifier field 460 may store an identifier associated with an interface belonging to the particular virtual node 230. Link identifier field 462 may store an identifier associated with a virtual link (e.g., virtual link 240) that interconnects the particular virtual node 230 to an adjacent virtual node 230. Adjacent virtual node field 464 may store an identifier associated with another virtual node 230, which is interconnected to the particular virtual node 230 via a particular interface and/or via a particular virtual link 240. IP address field 466 may store an IP address corresponding to an interface belonging to the particular virtual node 230. Add interface button 422 may permit a user to add additional entries (e.g., up to some maximum quantity of interface entries) via which additional information associated with interfaces may be entered.

Network node information location field 425 may store a location (e.g., a folder name, a directory path, a memory location, etc.), within VMM server 210 and/or memory 220, from which information, associated with a network node to which the particular virtual node 230 corresponds, may be retrieved when the particular virtual node 230 is powered up (e.g., started, turned on, booted up, etc.). The network node information may include, for example, configuration information (e.g. a network node identifier, a network node type, device characteristics, etc.), a copy of a network node operating system, and/or other information. Browse button 427 may permit the user to browse a directory of folders, files, and/or storage locations, associated with VMM server 210 and/or memory 220, in order to select (e.g., by pressing a button or series of button on a keypad associated with VMM server 210 and/or by using a pointing device associated with VMM server 210, etc.) a location from which to retrieve the information associated with the network node.

Virtual node configuration information location 430 may store a location (e.g., a folder name, a directory path, a memory location, etc.) within VMM server 210 and/or memory 220 at which configuration information, associated with the particular virtual node 230 (e.g., received, from the user, via set up UI 400), is to be stored. Browse button 432 may permit the user to browse a directory of folders and/or files in order to select a desired location at which to store the configuration information.

Save button 435 may permit a user of VMM server 210 to save the configuration information, associated with the particular virtual node 230, at the location within VMM server 210 and/or memory 220 as described above. Save & repeat button 440 may enable a user to save the configuration information associated with the particular virtual node 230 and/or to enter new configuration information for another virtual node 230 to be set up. Clear button 445 may enable a user to clear configuration information from fields associated with set up UI 400. Install button 450 may enable a user to power up (e.g., turn on, boot up, install etc.) one or more selected virtual nodes 230 that were set up. Powering up a selected virtual node 230 may enable the selected virtual node 230 to run a network node operating system and/or to perform operations in a manner similar to a network node to which the selected virtual node 230 corresponds. Exit button 455 may permit the user to exit set up UI 400.

Example Processes

Figure 5:
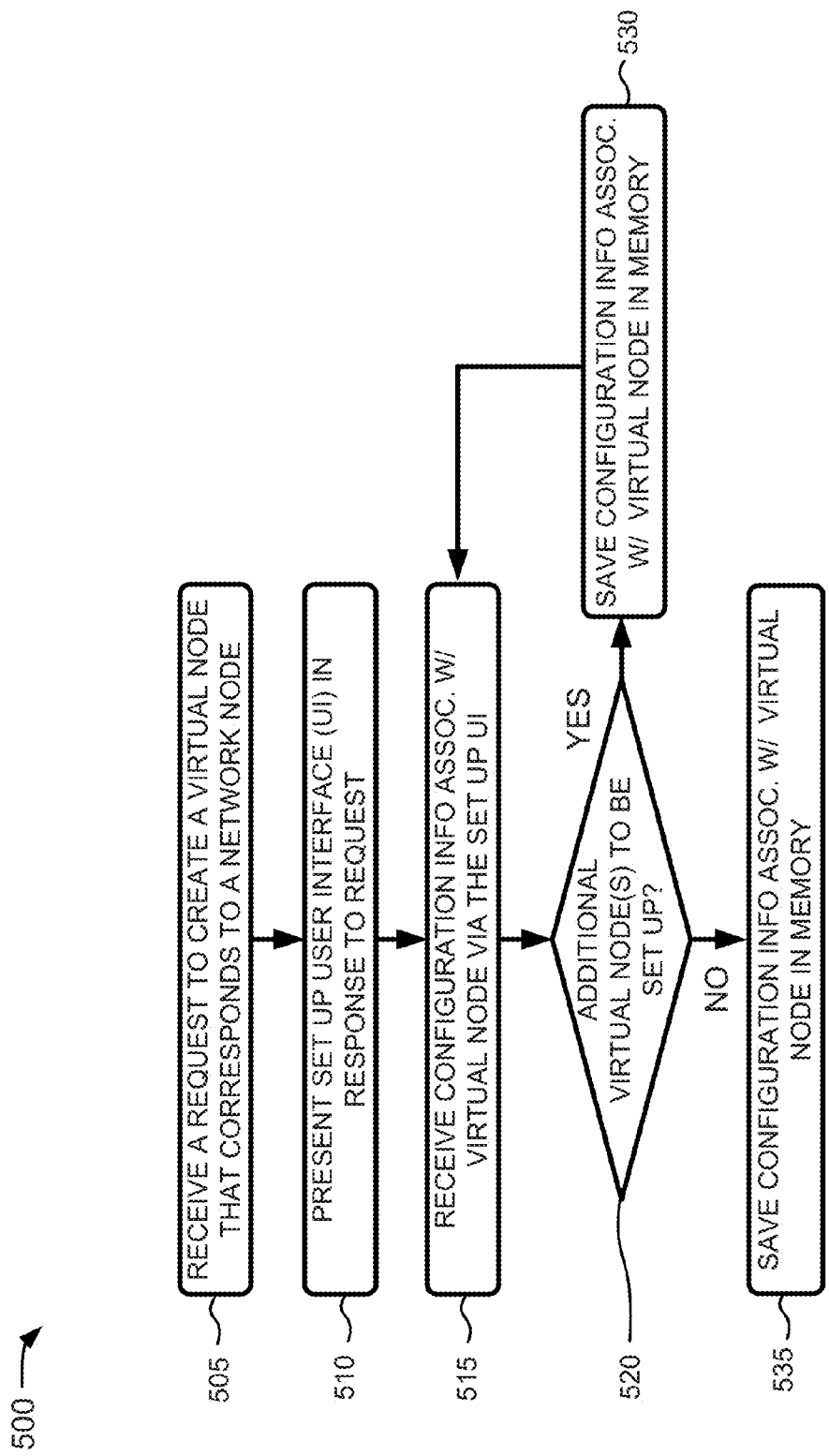
FIG. 5 is a flow chart of an example process for setting up a virtual node.

FIG. 5 is a flow chart of an example process 500 for setting up a virtual node 230. In one implementation, some or all of process 500 may be performed by VMM server 210 with memory 220. In another implementation, some or all of process 500 may be performed by one or more devices separate from or in combination with VMM server 210 and/or memory 220.

As shown in FIG. 5, process 500 may include receiving a request to create a virtual node that corresponds to a network node (block 505). For example, a VNPE application may receive a request, from a user of VMM server 210, to set up virtual node 230 (e.g., as a VM), that corresponds to a network node in a network (e.g., network 260 and/or some other network). The request may include information associated with the user (e.g., username, password, personal identification number, etc.). The VNPE application may receive the request and may authenticate the user to VMM server 210 by comparing the information associated with the user received in the request, to other information associated with the user stored in a memory associated with VMM server 210. Based on the comparison, the VNPE application may permit the user to set up virtual node 230 when the received information associated with the user matches the stored information associated with the user. The VNPE application may not permit the user to set up virtual node 230 if the received information associated with the user does not match the stored information associated with the user.

As also shown in FIG. 5, process 500 may include presenting a virtual node set up UI in response to the request (block 510). For example, based on the authentication, the VNPE application may retrieve information associated with a virtual node set up UI (e.g., fields and/or buttons 405-455 of set up UI 400 of FIG. 4) and may present set up UI 400 on a display (e.g., output device 370 of FIG. 3) associated with VMM server 210.

As further shown in FIG. 5, process 500 may include receiving configuration information associated with virtual node 230 via the virtual node set up UI (block 515). For example, the user may enter configuration information associated with virtual node 230 into set up UI 400 (FIG. 4) and the VNPE application may receive the configuration information via set up UI 400. The user may, for example, specify a device on which virtual node 230 is to be hosted by entering a device identifier (e.g., VMM server 210-1) into an entry associated with VMM server identifier field 405 of FIG. 4. The user may specify a guest operating system to be run by virtual node 230 when virtual node 230 is powered up. For example, the user may enter, into operating system image field 410 of FIG. 4, an identifier associated with a copy of a network node operating system (e.g., JUNOS® vX.X) that corresponds to the network node operating system that is executed by the network node to which virtual node 230 corresponds. The user may enter, into VM hostname field 415, an identifier associated with virtual node 230 (e.g., virtual node 230-1).

The user may specify logical interconnections between virtual node 230-1 and other virtual nodes 230 to be set up within a virtual network (e.g., virtual network 250). In one example, the user may enter, into interface identifier field 460 of FIG. 4, an interface identifier (e.g., em0) associated with an external link that permits management functions (e.g., monitoring, control, etc.) to be performed on virtual node 230-1. In this example, the user may enter, into link identifier field 462, an indication (e.g., a management indication) that the interface is reserved for the management functions or the VNPE application may, in another example, automatically populate link identifier field 462 with the indication.

In another example, the user may enter, into interface identifier field 460, an interface identifier (e.g., em1) that logically establishes an interface that permits virtual node 230-1 to communicate with another virtual node 230. In this example, the user may enter, into link identifier field 462, an identifier associated with a logical interconnection (e.g., virtual link 240-1) that interconnects virtual node 230-1, via the interface (e.g., em1), to the other virtual node 230. Additionally, or alternatively, the user may enter, into adjacent virtual node identifier field 464 of FIG. 4, an identifier (e.g., virtual node 230-2) associated with the other virtual node 230 to which virtual node 230-1 is to be interconnected via virtual link 240-1. The user may specify an IP address for the interface by entering an IP address (e.g., 192.85.1.1) into IP address field 466 of FIG. 4, or the VNPE application may, in another example, automatically assign an IP address at a future point in time when virtual node 230-1 is powered up.

In yet another example, the user may enter, into interface identifier field 460, an interface identifier (e.g., em2) associated with an external link that is reserved and/or which is not to be used to interconnect virtual node 230-1 to other virtual nodes 230. In this example, the user may enter, into link identifier field 462, an indication (e.g., a reserved indication) that the interface is reserved or the VNPE application may automatically populate link identifier field 462 with the indication.

The user may, in a manner described above, specify other interfaces (e.g., em3, em4, . . . , emK) (where K≥1), via set up UI 400, that enable virtual node 230-1 to communicate with other virtual nodes 230 (e.g., virtual node 230-3, 230-4, etc.). The user may, for example, select add interface button 422 of FIG. 4 to instruct the VNPE application to create additional entries associated with network interface mapping field 420, via which information associated with other interfaces may be specified.

The user may enter, into network node information location field 425 of FIG. 4, a storage location (e.g., NM server/network node/nnconfig.info), associated with VMM server 210 and/or memory 220, from which information associated with the network node may be retrieved during a power up operation. The user may also enter, into virtual node configuration information location field 430 of FIG. 4, a storage location (e.g., NM server/virtual node 230-1/vnconfig.info), associated with VMM server 210 and/or memory 220, to which configuration information associated with virtual node 230-1 is to be stored prior to being powered up.

Returning to FIG. 5, if additional virtual node(s) are to be set up (block 520—YES), then process 500 may include saving configuration information associated with virtual node 230 (block 530) and receiving configuration information associated with another virtual node via the set up UI (block 515). For example, the user may desire to set up another virtual node 230 and may send a request to set up the other virtual node 230 by selecting save & repeat button 440 of FIG. 4. The VNPE application may receive the instruction and may save the configuration information, associated with virtual node 230-1, in the storage location specified by the user in virtual node configuration information location field 430. The VNPE application may then receive, from the user, configuration information associated with the other virtual node 230, via set up UI 400 of FIG. 4, in a manner similar to that described above.

As shown in FIG. 5, if additional virtual node(s) are not to be set up (block 520—NO), then process 500 may include saving configuration information associated with virtual node 230 (block 535). For example, the user may set up one or more virtual nodes 230 in a manner similar to that described above, and may determine that no other virtual nodes 230 are to be set up. The user may send a request to save the configuration information associated with a last virtual node 230 (e.g., virtual node 230-N) by selecting save button 435 of FIG. 4.

The VNPE application may receive the request and may save the configuration information associated with the last virtual node 230, in a storage location specified by the user.

Figure 6:
FIG. 6 is a flow chart of an example process for installing a selected virtual node.

FIG. 6 is a flow chart of an example process 600 for installing a selected virtual node 230. In one implementation, some or all of process 600 may be performed by VMM server 210 with memory 220. In another implementation, some or all of process 600 may be performed by one or more devices separate from or in combination with VMM server 210 and/or memory 220.

As shown in FIG. 6, process 600 may include receiving a request to install a selected virtual node (block 605). For example, the user may send a request to install a selected virtual node 230 to VMM server 230. The request may include an identifier associated with selected virtual node 230 (e.g., virtual node 230-1 and/or other virtual nodes 230). In one example, the request may be received when the user selects install button 450 (e.g., associated with set up UI 400 of FIG. 4), which may permit the user to select virtual node 230-1 from a list of virtual nodes 230 (e.g., presented by the VNPE application in a UI that includes a list of virtual nodes 230—not shown).

In another example implementation, the user may send an install command to the VNPE application (e.g., via a display associated with VMM server 210) that identifies a configuration file location associated with selected virtual node 230 (e.g., virtual node 230-1) and/or a target location within VMM server 210 at which virtual node 230-1 is to be installed and/or powered up.

In yet another example implementation, the VNPE application may automatically initiate an install operation on virtual node 230 based on a determination that virtual node 230 has been set up in a manner similar to that described above (e.g., with respect to process 500 of FIG. 5).

As also shown in FIG. 6, process 600 may include retrieving configuration information associated with a selected virtual node (block 610) and installing the configuration information associated with the selected virtual node (block 615). For example, the VNPE application may, in response to the request to install selected virtual node 230, retrieve a configuration file associated with virtual node 230-1 that may contain configuration information associated with virtual node 230-1 obtained, at a prior point in time, when virtual node 230-1 was set up. Additionally, or alternatively, the VNPE application may install the retrieved configuration file at a target location, within VMM server 210, at which central processing unit (CPU) resources, memory, and/or storage space (e.g., from VMM server 210 and/or memory 220) may be allocated to virtual node 230-1. The CPU, memory and/or storage resources may, for example, enable the VNPE application to complete the installation of virtual node 230-1, to power up virtual node 230-1, and/or perform operations associated with a network node to which virtual node 230-1 corresponds.

As further shown in FIG. 6, process 600 may include establishing logical interconnections between installed virtual nodes based on retrieved configuration information (block 620). For example, the user may select other virtual nodes 230 to be installed in VMM server 210 and may, in a manner similar to that described above, cause the VNPE application to install the other selected virtual nodes 230. The VNPE application may use the installed configuration information, associated with each of the virtual network nodes 230, to establish logical interfaces (e.g., em0, em1, etc.), to create virtual links (e.g., management links, reserved links, virtual links 240-1, 240-2, etc.), and/or to assign IP addresses (e.g., IP addresses specified by the user during the set up process) to logical interfaces as specified by the user in the configuration information. Establishment of the logical interfaces may permit installed virtual node 230-1 to communicate with other installed virtual nodes 230 (e.g., virtual node 230-2, 230-3, etc.).

Figure 7:
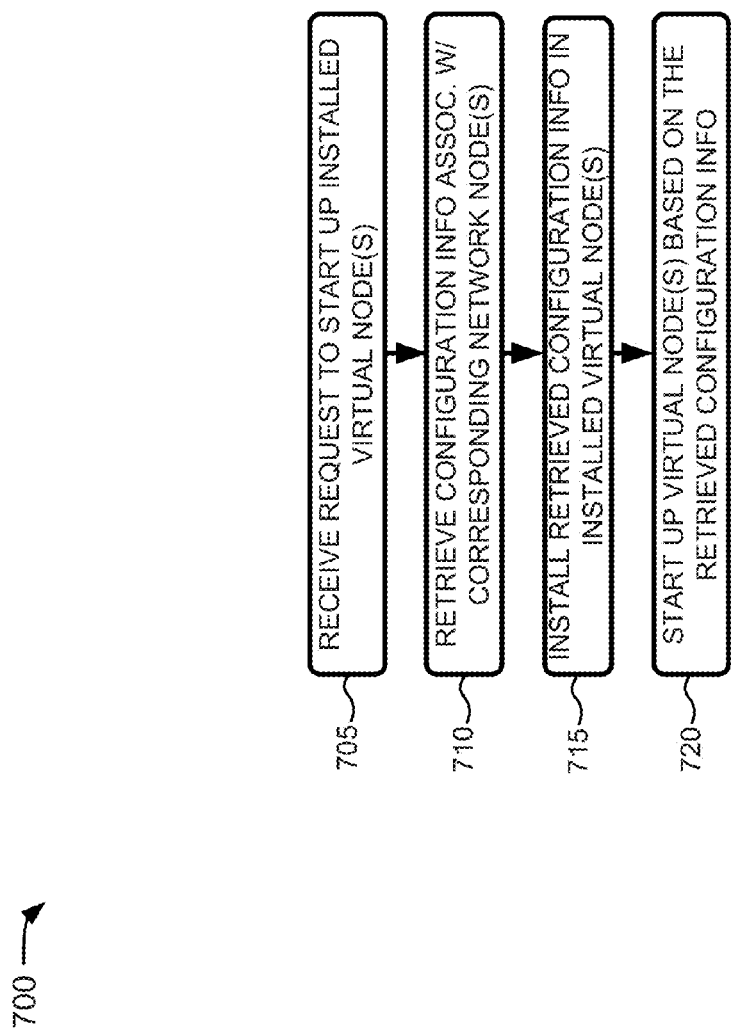
FIG. 7 is a flow chart of an example process for starting up installed virtual node(s)

FIG. 7 is a flow chart of an example process 700 for starting up installed virtual nodes 230. In one implementation, some or all of process 700 may be performed by VMM server 210 with memory 220. In another implementation, some or all of process 700 may be performed by one or more devices separate from or in combination with VMM server 210 and/or memory 220.

As shown in FIG. 7, process 700 may include receiving a request to start up installed network node(s) (block 705). For example, VMM server 210 may receive a start request from the user of VMM server 210. The start request may include an identifier associated with an installed virtual node 230 (e.g., virtual node 230-1). The VNPE application, in response to the start request, may communicate with virtual node 230-1 to initiate a start up operation. In another example, VMM server 210 may receive another start request that may include identifiers associated with each installed virtual node 230 corresponding to network nodes within a network (e.g., network 260 and/or some other network) and the VNPE application may communicate with each one of virtual nodes 230 to initiate a start up operation. In yet another example, VMM server 210 may receive the start request, that includes the identifier associated with virtual node 230-1 and may automatically communicate with virtual node 230-1 and/or with each of virtual nodes 230 to initiate a start up operation.

In another example implementation, the VNPE application may automatically initiation a start up operation on virtual node 230 based on a determination that an installation operation performed on virtual node 230 has been performed.

As also shown in FIG. 7, process 700 may include retrieving configuration information associated with a corresponding network node (block 710). For example, the VNPE application may communicate with virtual node 230-1, which may cause virtual node 230-1 to retrieve configuration information associated with a network node to which installed virtual node 230 (e.g., virtual node 230-1) corresponds. The retrieved configuration information may be obtained from network node configuration information location (e.g., within VMM server 210 and/or memory 220) as specified by the user in the configuration information associated with virtual node 230-1. The retrieved configuration information may include configuration information associated with the network node (e.g., type of network device, characteristics of network device, types and/or quantity of components of network device, etc.). The retrieved configuration information may also include a copy of the network node operating system (e.g., JUNOS® vX.X, Cisco®-base operating system, etc.) that is run on the network node, and/or other information associated with the network node. In another example, the copy of the network node operating system may include a general purpose operating system (e.g., Unix®-based operating system, a Sun Solaris®-based operating system, etc.) that is run by the network node. In yet another example, the VNPE application may communicate with the other virtual nodes 230, which may cause network node information, associated with network nodes to which the other virtual nodes 230 correspond, to be retrieved by the virtual nodes 230.

As further shown in FIG. 7, process 700 may include installing retrieved configuration information in installed virtual node(s) (block 715). For example, the VNPE application may install the retrieved configuration information, associated with a network node to which virtual node 230-1 corresponds, at a target location at which CPU resources, memory, and/or storage space were allocated to virtual node 230-1 (e.g. as a result of a prior install operation). Additionally, or alternatively, the VNPE application may install the retrieved configuration information, associated with other network nodes to which other network nodes 230 correspond, to target locations associated with other virtual nodes 230.

As yet further shown in FIG. 7, process 700 may include starting up virtual nodes based on the installed configuration information (block 720). For example, the VNPE application may cause IP addresses to be automatically assigned to logical interfaces associated with network node 230. In this example, the VNPE application may assign the IP address to interfaces to which IP addresses were not assigned by the user during a prior set up operation. The VNPE application may cause each virtual node 230 to execute an installed copy of a network operating system that may cause control plane protocols (e.g., IPv4, IPv6, MPLS, LSP, etc.) to be used when performing forwarding plane operations. For example, when executing the copy of the network node operating system, virtual node 230-1 may communicate with other virtual nodes 230 (e.g., virtual nodes 230-2, 230-3, etc.), via virtual links 240 (e.g., virtual link 240-1, 240-2, etc.) to obtain topographical information associated with a virtual network (e.g., virtual network 250) established as a result of the installation and/or start up operation of virtual nodes 230. Virtual node 230-1 may, for example, use the network topographical information to generate routing tables to be used to process packets in the forwarding plane. Additionally, or alternatively, virtual node 230-1 may use the routing tables to generate forwarding tables to process traffic received from and/or transmitted to other virtual nodes 230. In this example, virtual node 230-1 may use the forwarding tables to look up next hop information associated with incoming traffic based on source and/or destination address information associated with the traffic. The destination and/or source address may be obtained from the packet (e.g., from a header, a packet label, a packet trailer, etc.) using the control plane protocols. Virtual node 230-1 may, based on the look up and/or address information, transmit the traffic to the next hop. In this example, forwarding tables may be generated for each logical interface specified by the user.

In one example, the configuration information, associated with the network node to which virtual node 230-1 corresponds and which was installed in virtual node 230-1, may enable the VNPE application to logically simulate network node components, such as a processor (e.g., a routing engine (RE), hardware forwarding plane (e.g., packet forwarding engine), physical links (e.g., interfaces, such as em0, em1, etc.), and/or traffic sources/analyzers. In this example, when executing the copy of the installed network node operating system, virtual node 230-1 may simulate a RE (e.g., using a virtual RE) to obtain the network topographical information and/or to generate the routing tables and/or forwarding tables. The virtualized RE may, for example, generate forwarding tables that correspond to simulated PFEs (e.g., virtual PFEs), associated with network node 230-1, based on the configuration information associated with the network node. Thus, when performing forwarding plane operations, virtual node 230-1 may receive traffic via a particular logical interface associated with a virtual PFE. The virtual PFE may perform the look up operation, using a forwarding table that corresponds to the virtual PFE. The virtual PFE may determine, based on the look up, that the next hop (e.g., another virtual node 230 interconnected to virtual node 230-1 via virtual link 240) corresponds to the virtual PFE. Based on the lookup operation, the virtual PFE may forward the traffic to the next hop via virtual link 240. In another example, the virtual PFE may determine, based on the look up, that the next hop corresponds to another virtual PFE. Based on the determination, the virtual PFE may send the traffic to the next hop via the other virtual PFE associated with another interface and/or another virtual link 240.

Figure 8:
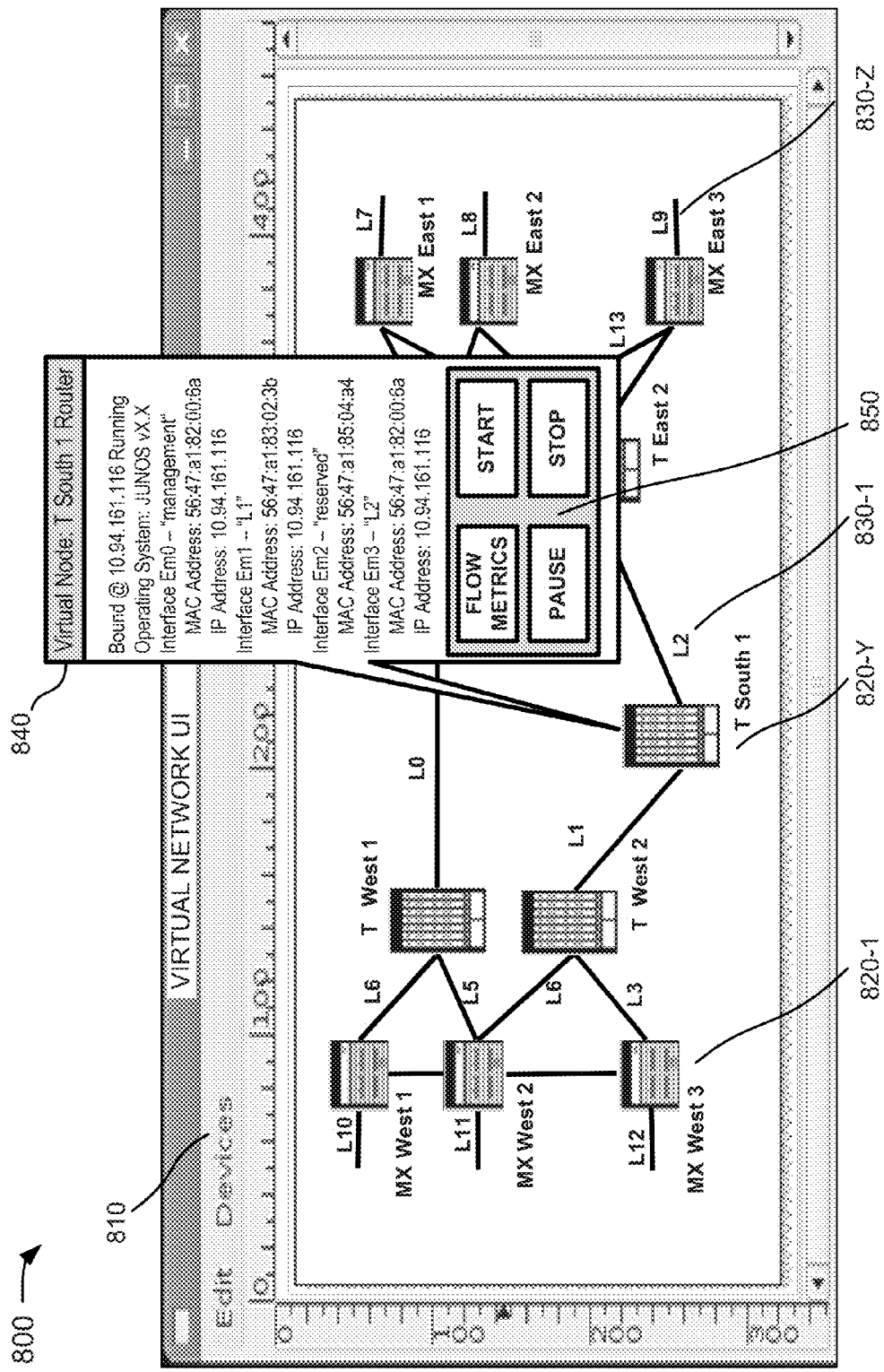
FIG. 8 is a diagram of an example virtual network user interface.

FIG. 8 is a diagram of an example virtual network user interface (UI) 800. For example, virtual network UI 800 may by presented for display on a display device associated with VMM server 210. As illustrated in FIG. 8, virtual network UI 800 may include a toolbar 810, a collection of virtual node data items 820-1, . . . , 820-Y (where Y≥1), a collection of virtual link data items 830-1, . . . , 830-Z (where Z≥1), a virtual device description window 840 (hereinafter referred to as "description window 840"), and virtual device command buttons 850 (hereinafter referred to as "command buttons 850" and individually as "command button 850"). Virtual network UI 800 includes data items and/or buttons 810-850 for explanatory purposes. In practice, virtual network UI 800 may include additional data items and/or buttons, fewer data items and/or buttons, different data items and/or buttons, and/or differently arranged data items and/or buttons than are described with respect to virtual network UI 800 of FIG. 8.

Virtual network UI 800 may permit a user, via a VMM server 210, to view virtual nodes, virtual links, and/or other devices associated with a virtual network that was created as a result of setting up virtual nodes 230 (e.g., as described with respect to FIG. 5), installing virtual nodes 230 (e.g., as described above with respect to FIG. 6), and/or starting up virtual nodes 230 (e.g., as described above with respect to FIG. 7). Additionally, or alternatively, virtual node UI 800 may enable the user to evaluate traffic flow, operational state of virtual node 230, and/or affects due to changes made to configuration information associated with virtual node 230 and/or software changes made to a network node operating system to which virtual node 230 corresponds.

Toolbar 810 may include commands (e.g., edit, devices, and/or other commands not shown on toolbar 810) that enable a user to monitor and/or control parameters associated with a virtual network displayed on virtual network UI 800. For example, the user may select a "devices" command to list virtual nodes 230 and/or virtual links 240, and/or other virtual devices associated with virtual network 250. In another example, the user may select an "edit" command to make changes to configuration information associated with virtual node 230. Virtual node data items 820 may correspond to virtual nodes 230 associated with virtual network 250. For example, virtual node data item 820-1 may correspond to virtual node 230 (e.g., identified as MX West 3) that is a particular type of virtual node 230 (e.g., an MX type). In another example, virtual node data item 820-Y may correspond to another virtual node 230 (e.g., identified as T south 1), which is a different type of virtual node 230 (e.g., a T type). Virtual link data items 830 may correspond to virtual links 240 that interconnect virtual nodes 230 within virtual network 250. Description window 840 may include information associated with virtual node 230 that was selected by the user and/or may include one or more command buttons 850. For example, description window 840 may include an identifier (e.g., virtual node: T south 1 router) associated with virtual node 230 and/or state information associated with virtual node 230. Command buttons 850 (e.g., flow metrics, start, pause, stop, etc.) may permit the user to send monitor and/or control instructions to virtual node 230 to edit configuration information, to monitor traffic flow metrics (e.g., data rates, packet processing, bandwidth utilization), to instruct virtual node 230 to perform some act, etc.

In one example implementation, the user may request to evaluate traffic flow and/or view state information associated with virtual node 230 (e.g., the T south 1 router) by selecting virtual node data item 820-Y on virtual network UI 800. The VNPE application may receive the selection, via virtual network UI 800, and may cause description window 840 to be displayed on virtual network UI 800. In one example, the VNPE application may communicate with virtual node 230 via a management interface, such as an Ethernet interface (e.g., em0), and/or via a serial console port to obtain state information associated with virtual node 230. The VNPE application may receive the state information and may present the state information for display via virtual network UI 800. As shown in FIG. 8, for example, the state information may include an indication as to whether virtual node 230 is running, an IP address associated with virtual node 230, information associated with interfaces corresponding to virtual node 230, and/or other state information associated with virtual node 230. The information associated with the interfaces may include an interface identifier (e.g. em1, em2, etc.) for each interface associated with particular virtual node 230, a function for which each interface is used (e.g., em0 corresponds to a management function), an IP address for each interface (e.g., em0 is assigned an IP address of 10.94.161.116), a MAC address for each interface (e.g., em0 is assigned a MAC address of 56:47:a1:82:00:6a), and/or other interface information.

The user may request to view flow metrics associated with virtual node 230 by selecting flow metrics button 850. The VNPE application may, for example, receive the request and may communicate with virtual node 230 (via the management and/or serial console port) to obtain traffic flow information. In one example, the VNPE application may obtain the traffic flow information (e.g., a data rate that includes a quantity of bits per second (bps) and/or other traffic flow information) and/or bandwidth utilization. In another example, the VNPE application may obtain packet accounting information, such as quantity of packets received, dropped, misordered, etc. In yet another example, the VNPE application by obtain information associated with a quality of service (QoS) associated with a packet flow, information associated with packet delay, jitter, etc.

The VNPE application may compare the traffic flow information to other traffic flow information, obtained at a prior point in time, to determine whether changes to a network, made since the prior point in time, achieve a desired result. For example, the VNPE may determine that the data flow is greater than another data flow at the prior point in time. In another example, the VNPE application may determine that a QoS is greater than a threshold and/or greater than another QoS at the prior point in time, etc.

The VNPE application may enable the user to view, via virtual network UI 800, traffic flows that are being emulated across a virtual network. For example, the VNPE may display, via virtual network UI 800, flow metrics associated with a packet stream being transported by a source virtual node that corresponds to virtual node data item 820 to a destination virtual node that corresponds to another virtual node data items 820. The packet stream may be transported from the source virtual node to the destination virtual node via a logical link that corresponds to one or more virtual link data items 830. VNPE application may display, via virtual network UI 800, traffic metrics and/or state information associated with the source and/or destination virtual nodes and/or the logical links.

In another example, the user may select pause button 850, which may cause the VNPE application to cease operations associated with virtual node 230. In this example, virtual node 230 may still be in an installed and/or powered-up state (e.g., IP addresses are assigned, MAC addresses are assigned, virtual links 240 with other virtual nodes 230 are preserved, etc.). The user may, for example, cause virtual node 230 to continue operations by again pressing pause button 850 and/or some other button. The user may instruct that virtual node 230 be powered down by selecting stop button 850. The VNPE application may, for example, receive the instruction and may cause virtual node 230 to cease operations. Additionally, or alternatively, the VNPE application may cause IP addresses and/or MAC addresses to no longer be assigned to virtual node 230. The VNPE application may further cause configuration information associated with a network node and/or a network node operating system to be uninstalled from virtual node 230. In another example, the user may instruct virtual node 230 to start up after an install operation (e.g., as described above with respect to FIG. 6) and/or after being paused and/or stopped as described above. The VNPE application may, for example, receive the instruction and may cause virtual node 230 to start up in a manner similar to that described above (e.g., with respect to process 700 of FIG. 7). In this example, virtual node 230 may retrieve (e.g., from VMM server 210 and/or memory 220) and/or install a copy of a network node operating system, may assign IP addresses and/or MAC addresses to logical interfaces, may obtain virtual network 250 topographical information, may generate routing and/or forwarding tables, etc.

In another example implementation, the user may monitor and/or control virtual node 230 by entering instructions to a network node operating system (e.g., by entering command lines) instead of, or in addition to, using virtual network UI 800. For example, the user may obtain state information from particular virtual node 230 by entering a command line, or series of command lines, into a user interface associated with a network node operating system (e.g., operating systems that are UNIX®-based, JUNOS®-based, Cisco®-based, etc.) being executed by particular virtual node 230. In one example, the user may view a list of serial console port connections and/or management Ethernet ports associated with particular virtual port 230 by entering a particular command line that includes an indication of a desired port type (e.g., serial, management, etc.) and/or an identifier for particular virtual node 230 (e.g., T south 1). The user may connect to virtual node 230 by entering a command line that includes one or more of the port connections from the list of port connections. Once connected, the user may enter a command to list state information associated with particular virtual node 230 that includes a list command (e.g. Vmm list) and/or the identifier associated with particular virtual node 230.

In another example, the user may enter command lines to review flow metrics, to pause virtual node 230, to stop and/or power down virtual node 230, to start up virtual node 230, and/or perform other operations associated with virtual node 230.

CONCLUSION

An implementation described herein may include systems and/or methods that provide for a virtual network prototype environment that enables a network to be modeled, using logically interconnected virtual nodes (e.g., based on virtual machines (VMs)). The virtual network prototype environment may permit changes to the network and/or conditions associated with the network to be evaluated, in a virtual network that includes the logically interconnected virtual nodes, prior to making the network operational.

In one example implementation, a virtual node may be set up, in a virtual network, using a set up UI via which a user may enter configuration information associated with the virtual node to be set up. The configuration information may include information associated with logical interfaces and/or other information to be associated with the virtual node.

In another example implementation, a virtual node may be installed in the virtual network. For example, the VNPE application may install the virtual node on a server device using the configuration information received from the user. The VNPE application may use the configuration information to establish logical interfaces, for the virtual node, that enable the virtual node to communicate with other virtual nodes within a virtual network.

In yet another example implementation, a virtual node may be started up in the virtual network. For example, the VNPE application may use a copy of an operating system, that is run on a network node to which the virtual node corresponds, to start up the virtual node. The VNPE application may, for example, cause the virtual node to run the copy of the operating system that may permit the virtual node to obtain topographical information associated with the virtual network, to generate a routing table using the topographical information, and/or to generate forwarding tables based on the routing tables.

In still another example, implementation, the VNPE application may present, on a display device associated with a server device, state information, associated with a started up virtual node, that includes an identifier as to whether the virtual node is running, interface information associated with the virtual node, network address information, etc. The VNPE application may also present information associated with a manner in which the virtual node is processing network traffic received from and/or sent to other virtual nodes.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 5-7, the order of the blocks may be modified in other implementations. Further, non-dependent blocks may be performed in parallel.

It will be apparent that aspects, as described herein, may be implemented in many different forms of software, firmware, and hardware in the implementations illustrated in the figures. The actual software code or specialized control hardware used to implement aspects described herein is not limiting of the invention. Thus, the operation and behavior of the aspects were described without reference to the specific software code—it being understood that software and control hardware may be designed to implement the aspects based on the description herein.

Further, certain portions, described above, may be implemented as a component that performs one or more functions. A "component," as used herein, may include hardware, such as an ASIC or FPGA, or a combination of hardware and software (e.g., a processor, executing software).

Also, while certain user interfaces have been described above, in another implementation, the user interfaces may include additional, fewer, different, or differently arranged data items.

The term "concurrent" or "concurrently," as used herein, may correspond to an operation being performed on two or more devices (e.g., VMs 230) in a concurrent and/or parallel manner (e.g., at the same time or approximately the same time). Additionally, or alternatively, the term "concurrent" or "concurrently," as used herein, may correspond to an operation being performed on two or more devices in a partially concurrent manner in which an operation may be performed on two or more devices in parallel (e.g., at approximately the same time) and one or more other devices immediately before or after the parallel operation starts or ends.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
receiving, by a server device, configuration information;
creating, by the server device and using the received configuration information, a virtual node,
the created virtual node corresponding to a network node of a plurality of network nodes, and
creating the virtual node including:
creating one or more logical connections, associated with the created virtual node, to communicate traffic to other virtual nodes of a plurality of virtual nodes;
determining, by the server device, information associated with an operating system that is executed by the network node;
creating, by the server device and using the information associated with the operating system and the created virtual node, an operational virtual node;
causing, by the server device, the operational virtual node to execute the information associated with the operating system based on configuration information associated with the network node;
causing, by the server device, the operational virtual node to communicate with the other virtual nodes, of the plurality of virtual nodes, to determine network topology information associated with a virtual network; and
causing, by the server device, the operational virtual node to generate routing tables based on the determined network topology information.

2. The method of claim 1, further comprising:
causing the operational virtual node to use the generated routing tables to process a packet.

3. The method of claim 2, where
the generated routing tables are used to identify next hop information associated with the packet,
the next hop information being based on at least one of a source address associated with the packet or a destination address associated with the packet; and
the packet is processed based on the next hop information.

4. The method of claim 1, further comprising:
causing the operational virtual node to simulate one or more components, the routing tables being generated based on the simulation.

5. The method of claim 1, further comprising:
receiving a request to create the virtual node; and
providing, for presentation and based on the received request, an interface for receiving the configuration information.

6. The method of claim 1, further comprising:
receiving a request to create another virtual node;
providing, for presentation and based on the received request, an interface for receiving configuration information associated with the other virtual node; and
creating, using the received configuration information associated with the other virtual node, the other virtual node.

7. The method of claim 1, further comprising:
receiving a request to stop the operational virtual node; and
causing, based on the request to stop the operational virtual node, the operational virtual node to stop operation.

8. A device comprising:
a memory to store instructions; and
a processor to execute the instructions to:
receive configuration information;
create, using the received configuration information, a virtual node,
the created virtual node corresponding to a network node of a plurality of network nodes, and
where the processor, when creating the virtual node, is to:
create one or more logical connections, associated with the created virtual node, to communicate traffic to other virtual nodes of a plurality of virtual nodes;
determine information associated with an operating system that is executed by the network node;
create, using the information associated with the operating system and the created virtual node, an operational virtual node;
cause the operational virtual node to execute the information associated with the operating system based on configuration information associated with the network node;
cause the operational virtual node to communicate with the other virtual nodes, of the plurality of virtual nodes, to determine network topology information associated with a virtual network; and
cause the operational virtual node to generate routing tables based on the determined network topology information.

9. The device of claim 8, where the processor is further to:
cause the operational virtual node to use the generated routing tables to process a packet.

10. The device of claim 9, where
the generated routing tables are used to identify next hop information associated with the packet,
the next hop information being based on at least one of a source address associated with the packet or a destination address associated with the packet; and
the packet is processed based on the next hop information.

11. The device of claim 8, where the processor is further to:
cause the operational virtual node to simulate one or more components, the routing tables being generated based on the simulation.

12. The device of claim 8, where the processor is further to:
receive a request to create the virtual node; and
provide, for presentation and based on the received request, an interface for receiving the configuration information.

13. The device of claim 8, where the processor is further to:
receive a request to create another virtual node;
provide, for presentation and based on the received request, an interface for receiving configuration information associated with the other virtual node; and
create, using the received configuration information associated with the other virtual node, the other virtual node.

14. The device of claim 8, where the processor is further to:
receive a request to stop the operational virtual node; and
cause, based on the request to stop the operational virtual node, the operational virtual node to stop operation.

15. A non-transitory computer-readable medium storing instructions, the instructions comprising:
one or more instructions which, when executed by a processor, cause the processor to:
receive configuration information;
create, using the received configuration information, a virtual node,
the created virtual node corresponding to a network node of a plurality of network nodes, and
the one or more instructions to create the virtual node include:
one or more instructions to create one or more logical connections, associated with the created virtual node, to communicate traffic to other virtual nodes of a plurality of virtual nodes;
determine information associated with an operating system that is executed by the network node;
create, using the information associated with the operating system and the created virtual node, an operational virtual node;
cause the operational virtual node to execute the information associated with the operating system based on configuration information associated with the network node;
cause the operational virtual node to communicate with the other virtual nodes, of the plurality of virtual nodes, to determine network topology information associated with a virtual network; and
cause the operational virtual node to generate routing tables based on the determined network topology information.

16. The non-transitory computer-readable medium of claim 15, where the instructions further include:
one or more instructions to cause the operational virtual node to use the generated routing tables to process a packet, where
the generated routing tables are used to identify next hop information associated with the packet,
the next hop information being based on at least one of a source address associated with the packet or a destination address associated with the packet; and
the packet is processed based on the next hop information.

17. The non-transitory computer-readable medium of claim 15, where the instructions further include:
one or more instructions to cause the operational virtual node to simulate one or more components,
the routing tables being generated based on the simulation.

18. The non-transitory computer-readable medium of claim 15, where the instructions further include:
one or more instructions to receive a request to create the virtual node; and
one or more instructions to provide, for presentation and based on the received request, an interface for receiving the configuration information.

19. The non-transitory computer-readable medium of claim 15, where the instructions further include:
one or more instructions to receive a request to create another virtual node;

one or more instructions to provide, for presentation and based on the received request, an interface for receiving configuration information associated with the other virtual node; and one or more instructions to create, using the received configuration information associated with the other virtual node, the other virtual node.

20. The non-transitory computer-readable medium of claim 15, where the instructions further include:

one or more instructions to receive a request to stop the operational virtual node; and one or more instructions to cause, based on the request to stop the operational virtual node, the operational virtual node to stop operation.

* * * * *